April 5, 1966 T. M. LO CASALE ET AL 3,244,908

LOGIC CIRCUIT UTILIZING TUNNEL AND ENHANCEMENT DIODES

Filed Feb. 11, 1963 2 Sheets-Sheet 1

INVENTORS
THOMAS M. LOCASALE
WOO F. CHOW
JACK S. CUBERT

BY G. Donald Weber, Jr.
AGENT

United States Patent Office 3,244,908
Patented Apr. 5, 1966

3,244,908
LOGIC CIRCUIT UTILIZING TUNNEL AND ENHANCEMENT DIODES

Thomas M. Lo Casale, Warminster, Woo F. Chow, Horsham Township, Montgomery County, and Jack S. Cubert, Willow Grove, Pa., assignors to Sperry Rand Corporation, New York, N.Y., a corporation of Delaware Filed Feb. 11, 1963, Ser. No. 257,475
14 Claims. (Cl. 307—88.5)

This invention relates to a circuit which performs a logic function. In particular, the subject circuit provides improved operation which eliminates possible inadvertent and spurious electrical signals.

With the advent of the tunnel diode, a vast area of high speed switching circuits has been opened. That is, because of the high speed switching characteristics of the tunnel diode, circuits which are capable of high speed operation can be produced. A particular area of utilization of these types of circuits is in high speed electronic data processing machines. In addition, since the basic circuits have been devised, a great deal of research and investigation of these circuits and their operation has been performed. As a result of this intensive investigation, circuits which have improved operation have been devised. One of the original circuits which was developed is described in a copending application of Brian E. Sear, entitled Logic Circuit, which was filed on February 21, 1962, has the Serial Number 174,829, and is assigned to the assignee of this invention. However, improvements have been made in the operation of the circuit therein described. Some improvements are of the nature to provide selective isolation in the coupling network between the active tunnel diode component and the input circuits associated therewith.

Thus, it will be seen that one object of this invention is to provide a reliable NOR circuit of the tunnel-diode storage-diode type.

Another object of this invention is to provide a circuit which eliminates certain possible spurious operation by isolating the tunnel diode and the storage diode networks.

Another object of this invention is to provide a logic circuit which has larger tolerance margins as well as larger fan-in and fan-out capabilities.

These and other objects and advantages of this invention will become more readily apparent when the following description is read in conjunction with the accompanying drawings, in which.

Figure 1:
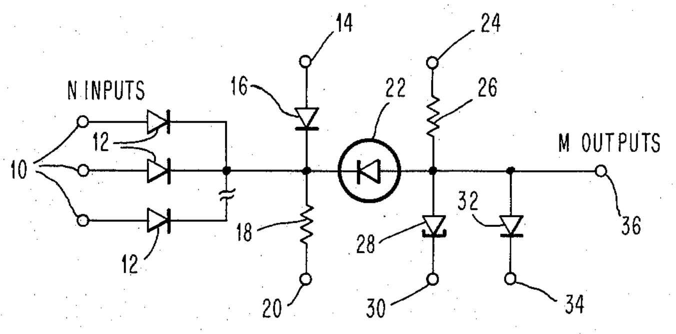
FIG. 1 PRIOR ART
FIGURE 1 is a schematic diagram of a logic circuit known in the art.

Referring now to FIGURE 1, there is shown a circuit which is known in the art. In particular, this circuit was described in the copending application of B. E. Sear, noted supra. For detailed descriptions of the operations of the circuit shown in FIGURE 1, reference is made to the copending application. Briefly, however, the circuit is a logic circuit which performs the NOR logic function. Thus, the sources 10 are any conventional sources capable of supplying input signals having two different magnitudes. The rectifier diodes 12 are provided to transfer signals from the sources 10 to the circuit in accordance with the forward or reverse-biased condition thereof. Source 20, which may be any negative potential supplying source, and resistor 18 combine to form a substantially constant current sink. Source 14, which may be any type of source capable of supplying a positive going pulse, is connected to the anode of coupling diode 16 which has the cathode thereof connected to the cathodes of input diodes 12 and one terminal of resistor 18. In addition, the cathode of storage diode 22 is connected to this latter junction which includes the cathodes of the input diodes 12. The anode of storage diode 22 is connected to the anode of tunnel diode 28 which has the cathode thereof connected to a substantially constant reference potential source 30, as for example ground. A substantially constant current source comprising a positive potential source 24 and resistor 26 are connected to the anode of diode 22 and tunnel diode 28 to bias the tunnel diode in the bistable state. The reset network comprising source 34 which is any conventional type of source capable of supplying a negative going pulse and the diode 32 are connected to the anode of tunnel diode 28. The output of terminal 36 is also connected to the anode of tunnel diode 28.

In a macroscopic description of the operation of the circuit, current will flow from source 24 to sink 20 via resistor 26, storage diode 22 and resistor 18, if and only if, a low level signal is supplied by source 10 whereby rectifier diodes 12 are reverse-biased. The forward current flow through storage diode 22 causes the storage of charge therein. The subsequent application of a positive going pulse by source 14 via coupling diode 16 effectively creates a reverse current through diode 22 by sweeping out the charge stored therein. The reverse current is determined to be sufficient to switch tunnel diode 28 from the low voltage operating condition to the high voltage operating condition.

On the other hand, if a high level input signal is supplied by any one of the sources 10 via rectifier diode 12, the potential at the cathode of diode 22 will be sufficiently high that this diode is reverse biased. Therefore, there is no forward current therethrough. With the subsequent application of a signal by source 14, a reverse current through diode 22 is impossible inasmuch as no charge is stored therein because of the absence of a forward current. Therefore, tunnel diode 28 remains in the low voltage operating region. The reset network operates to provide a signal at the anode of tunnel diode 28 such that the tunnel diode is switched from the high voltage operating condition to the low voltage operating condition (if necessary) in either case.

Summarizing, it will be seen that when the input signal is low and the tunnel diode is in the low condition, forward current flows through storage diode 22. Similarly, forward current flows through diode 22 when the input signals are low and the tunnel diode is in the high operating condition. The contrary is true, however, when the input signal is high and the tunnel diode is low. In this condition the diode 22 is reverse-biased and no forward current therethrough is produced. In the condition when the input signals are high and the tunnel diode is in the high condition diode 22 should remain reverse-biased, in view of the proposed logic operation of the circuit. However, if the potential supplied by source 10 and the potential at the anode of tunnel diode 28 are of a similar magnitude, spurious forward current may inadvertently flow through diode 22 thereby storing charge therein. Thus, with the subsequent application of a signal by source 14 a spurious signal may be applied to tunnel diode 28. In other words, the storage diode acts as a memory element and retains the charge inadvertently stored therein while the potential was high at both an input 10 and the anode of the tunnel diode 28. Therefore, tunnel diode 28 may be reset to the low operating condition by the reset network without affecting the condition of the storage diode 22. Thus, the reverse current created by the application of a signal at source 14 provides an incorrect signal which switches the tunnel diode to the high voltage operating condition in spite of the high level input signal. It is to be understood, of course, that this type of operation is not often encountered. However, if and when the spurious operation does occur, the incorrect information provided thereby is undesirable. Therefore, the improvements shown in the embodiments of the following figures are provided.

Figure 2:
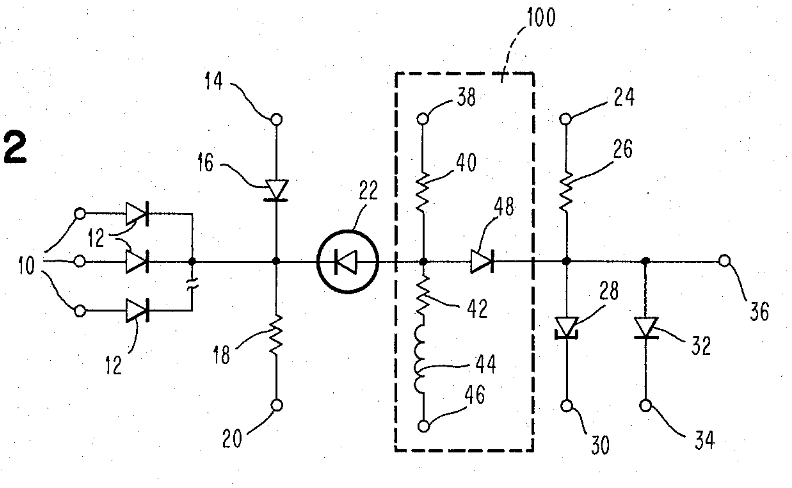
FIGURE 2 is a schematic diagram of one embodiment of the improved circuit using a potential divider isolation network.

Referring now to FIGURE 2 there is shown a schematic diagram of one embodiment of the improved circuit. In this figure, components similar to those in FIGURE 1 bear similar reference numerals. In addition, the isolating-coupling network which provides the improved circuit operation is shown within the dashed outline 100. This isolating-coupling network is connected between the anode of the storage diode 22 and the anode of the tunnel diodes 28. In particular, the N inputs 10 may be any conventional sources capable of alternatively supplying different signals. The signals supplied may be of the pulse or level type. Typical magnitudes for the different signals are +50 and +450 millivolts with respect to ground potential as are all the suggested potentials. The input coupling diodes 12 are preferably germanium diodes which exhibit high speed switching and little or no charge storage, typically International Diode ID5–050 diodes. The input sources 10 are connected to the anodes of diodes 12 and the cathodes of these input coupling diodes are each connected to the cathode of diode 16. Diode 16 which is preferably a high-conducting, fast-switching, silicon diode, as for example a Fairchild FD7 type diode, has the anode thereof connected to source 14. Source 14 which may be considered a set or clock source may be any conventional source capable of supplying a periodic pulse. A signal supplied by this source may preferably have a base value of zero or ground potential and a peak magnitude of approximately +3 volts. The source 20 which may be any conventional type of source which supplies a substantially constant potential of approximately −7.5 volts, for example, is connected to one terminal of resistor 18. Another terminal of resistor 18 which may be on the order of about 5,000 ohms is connected to the cathode of diode 16. Also connected to the cathode of diode 16 is the cathode of storage diode 22. The storage diode may be any semiconductor diode which exhibits charge storing capabilities as for example a Hewlett Packard XR134 type diode. In the circuit shown in FIGURE 1 the anode of this diode was connected to the anode of the tunnel diode. However, in the improved circuit shown in FIGURE 2, the anode of storage diode 22 is connected to one terminal of resistor 40 which may be on the order of about 950 ohms and which has another terminal thereof connected to source 38. Source 38 may be any conventional source capable of supplying approximately +13 volts. One terminal of resistor 42 is also connected to the anode of diode 22. Another terminal of resistor 42 which may be on the order of about 50 ohms, is connected to the terminal of the inductor coil 44. This inductor is a small inductor and may have an inductance value on the order of approximately 100 nanohenries. Another terminal of the inductor 44 is connected to source 46. Source 46 may be any conventional potential source capable of supplying a substantially constant potential and may, in fact, be ground potential. It will be seen that the network connected between source 38 and source 46 comprises a "voltage-divider" network wherein the potential at the anode of storage diode 22 may be controlled. In addition, the inductor 44 may be eliminated and a purely resistive voltage divider network provided. However, by properly choosing the values of L for the inductor 44 and R for the resistor 42, a time constant $L/R$ will be provided such that the current pulse provided by the diode amplifier (storage diode 22) will be applied to diode 48 with virtually no attenuation. In other words, the impedance of the inductor to the high frequency harmonics of the relatively fast rise-time leading edge of the current pulse will be very large. On the other hand, the impedance of the inductor 44 will be negligible in the absence of a current pulse and in the presence of a substantially constant current applied thereto whereby forward current may be supplied to diode 22.

Also connected to the anode of diode 22 is the anode of diode 48. Diode 48 is preferably a silicon diode (because of the relatively high break point potential thereof) and is characterized by having high speed switching as well as high conductance and little or no charge storage. A typical diode is the Fairchild FD600. The cathode of diode 48 is connected to the anode of tunnel diode 28 which may be an RCA 1N3129 type tunnel diode which has a peak current approximately 20 milliamperes. Diode 48 provides the isolation coupling between the storage charge diode 22 and the tunnel diode 28. The cathode of the tunnel diode 28 is connected to the source 30 which may be any conventional source capable of supplying a substantially constant potential and may, in fact, be ground potential. Also connected to the anode of tunnel diode 28 is one terminal of resistor 26 which may be on the order of 820 ohms and which has another terminal thereof connected to the source 24. Source 24 may be any conventional source capable of supplying a substantially constant potential on the order of approximately +10 volts. In addition, the anode of tunnel diode 28 has connected thereto the anode of diode 32 which is a reset diode. This diode may be for example a Hughes HD5000 silicon diode which has little or no charge storing capabilities while having high speed switching characteristics. The cathode of diode 32 is connected to source 34 which may be any type of source which is capable of supplying a selectively periodic signal. The signal supplied by the source has a base potential of approximately zero volts or ground potential and is capable of supplying a signal which has a magnitude of approximately −3 volts with respect to the base potential. This reset signal is similar to the set signal supplied by source 14 but is supplied at a different time. However, it is contemplated that the signals supplied by source 14 and 34 may be supplied by single source with the provision that the signal supplied by one of the sources 14 and 34 is inverted and delayed. The application of the set and reset signals does not form a critical portion of this invention and, therefore, is not described in detail. Finally, the M output signals supplied by the circuit and represented by output terminal 36 are obtained from the anode of tunnel diode 28.

The operation of the circuit of FIGURE 2 is similar to the operation of the circuit shown in FIGURE 1. However, the insertion of the isolating-coupling network 100 provides improved operation. The operation as described herein, is very detailed and is exemplary only. Thus, if certain of the components are altered, alterations must be made in certain other of the components or sources or both. However, alteration in the components does not alter the inventive principles described. To describe the operation of the circuit, it is first assumed that the input signal supplied by source 10 is a high level signal. That is, the input signal supplied by source 10 is on the order of +450 millivolts. Inasmuch as the cathode of input diode 12 is effectively below ground potential due to the combined effect of sources 14 and 20, forward current through diode 12 is produced. It will be seen that the operation of the diode is limited to approximately 1.5 milliamperes. At this current value, the potential drop across diode 12 is on the order of about 350 millivolts, Thus, the cathode potential of diode 12 is about +100 millivolts. The difference between the cathode of diode 12 and source 20 produces a current of about 1.5 milliamperes through resistor 18. Since diode 22 has a breakpoint potential on the order of about 500 to 550 millivolts, it is desirable that the potential at the anode thereof is limited to and does not exceed a potential of approximately +650 millivolts. Thus, the potential difference across the diode 22 is on the order of +550 millivolts. With such a potential difference thereacross, the diode 22 is relatively non-conducting. Of course a small current value on the order of approximately 0.1 milliampere may flow through this diode. However, this small current is virtually negligible especially insofar as charge storage in the diode 22 is concerned. Thus, the effect of diode 22 (and similarly diode 48) may be substantially ignored in considering the voltage divider effect between sources 38 and 46. Thus, when a potential drop of 13 volts exists between sources 38 and 46 which potential drop occurs across a resistance total of 1000 ohms, a current exists in this network which is on the order of about 13 milliamperes.

It will be seen that with this current, the potential at the anode of diode 22 is on the order of +650 millivolts. With a potential of +650 millivolts on the anode thereof and +100 millivolts on the cathode thereof, the potential difference across diode 22 is on the order of +550 millivolts. This potential difference across the diode is insufficient to cause more than a negligible flow of current therethrough as discussed supra.

In addition, the +650 millivolt potential is applied to the anode of the coupling diode 48. The cathode of diode 48 is connected to the anode of tunnel diode 28. Since the tunnel diode is referenced with respect to ground potential at source 30, the minimum potential at the anode thereof is about +50 millivolts. Thus, the potential difference across diode 48 is on the order of +600 millivolts. Since diode 48 is a silicon diode which has a breakpoint potential of approximately +650 to +700 millivolts, it is clear that a negligible current, at most flows through the coupling diode. This negligible current is insufficient to switch tunnel diode 28 from the low voltage operating condition to the high voltage operating condition.

If now, it is assumed that the input signal supplied by source 10 is a low level signal on the order of +50 millivolts, it will be seen that the potential at the cathode of input diodes 12 drops to approximately −150 millivolts inasmuch as the potential drop across the diode at a lower current condition is about 200 millivolts. Actually, the potential at the cathode of diodes 12 tends to drop to a lower potential. However, when the potential at the cathodes of the diodes 12 and 22 reaches such a level that the potential difference across diode 22 exceeds the breakpoint potential, diode 22 begins to conduct a current which is approximately 1.5 milliamperes. Inasmuch as source 38 and resistor 40 comprise a substantially constant current source which supplies about 13 milliamperes, 1.5 milliamperes flows to diode 22 and the remainder, or 11.5 milliamperes, flows to source 46. Thus, the potential drop across resistor 42 decreases wherein the potential at the anode of diode 22 decreases to approximately +575 millivolts. This potential is clearly insufficient to render diode 48 conductive. Moreover, inasmuch as the potential at the anode of diode 22 is at about −150 millivolts, the total potential difference across diode 22 is on the order of 725 millivolts. This potential difference across the storage diode is sufficient to render the diode conductive. Since the diode 22 is conducting a substantial current in the forward direction, charge is stored in the lattice structure of this diode.

The above portion of the description of the operation of the circuit defines the operation of the circuit in substantial "steady-state" condition. That is, the description defines the potentials and current which exist in response to high or low level input signals. This description does not include the actual operation of the circuit insofar as the operation is concerned regarding the application of a clock pulse.

The overall operation of the circuit will be described with the initial assumption that the input signal is a high level signal. Moreover, it will be initially assumed that the tunnel diode 28 is in the low level operating condition. That is, the tunnel diode 28 may have been reset by the reset network comprising source 34 and diode 32 or it may be assumed that in the initial operation, the bias network comprising source 24 and resistor 26 causes diode 28 to be biased in the low level operating condition. With the application of the high level input signal, a relatively high potential (+100 millivolts) is applied at the cathode of diode 22 whereby this diode is effectively reverse biased or zero biased (the anode is at +650 millivolts) such that, at most, a negligible current flows therethrough. This negligible current is insufficient to provide any significant charge storage in the lattice structure of this diode. Therefore, with the application of the clock pulse by source 14, the potential at terminal 14 rises from ground potential to +3 volts. This high level potential at the anode of diode 16 is sufficient to cause this diode to conduct. However, the conduction of this diode causes the potential at the cathode thereof to rise to a potential in excess of about +2 volts. With this potential at the cathodes of the respective diodes, diodes 12 and 22 are reverse biased and cannot pass current therethrough. Therefore, the current and potential signal supplied by source 14 is dissipated in resistor 18 and sink 20. Since the clock signal was dissipated in the resistor, clearly no change is made in the remainder of the circuit whereby tunnel diode 28 remains in the low level operating condition.

If now, it is assumed that the input signal supplied by source 10 is a low level signal or signal on the order of +50 millivolts, the potential at the cathodes of diodes 12 and 22 is a substantially low level potential (−150 millivolts) whereby storage diode 22 conducts a forward current therein. This forward current causes the storage of charge in the lattice structure of the diode in accordance with the known principles. This stored charge may be swept out of the diode by the application of a reverse-biasing potential. Moreover, the storage diode acts as a very low impedance relative to this reverse current. Therefore, with the application of a clock signal to terminal 14, the diode 16 conducts whereby the potential at the cathode of diode 22 exceeds a potential of about +2 volts. This potential is substantially higher than the potential of approximately +575 millivolts at the anode of diode 22. Since the diode 22 is a much lower impedance than the 5,000-ohm impedance of resistance 18, a large reverse current flows in diode 22. This current signal is in the form of a pulse which is substantially defined by the clock signal applied at terminal 14.

Inasmuch as the leading edge of this signal or pulse has a fairly fast rise time, the inductor 44 presents a relatively large impedance to the signal. Moreover, because of current sharing of the several circuit branches, the potential at the anodes of diodes 22 and 48 will be on the order of about 1.5 volts. This potential is more than sufficient to cause diode 48 to conduct in the forward direction even though the cathode thereof is biased to about +50 millivolts by tunnel diode 28.

The application of a relatively large potential, on the order of about +500 millivolts, to the anode of tunnel diode 28 is sufficient to cause the tunnel diode to switch from the low voltage operating region to the high voltage operating region. When the pulse supplied to the terminal 14 terminates or the charge stored in diode 22 has been substantially completely swept out of the lattice structure, no reverse current exists whereupon the potential at the anode of diode 48 decreases to approximately +650 millivolts. As described supra this potential is insufficient to continue the conduction of diode 48. Therefore, tunnel diode 28 assumes the stable operating condition wherein the potential exhibited at the anode thereof is on the order of +450 millivolts. This potential at the anode of the tunnel diode is also detectable at the output terminal 36. Moreover, the potential difference exhibited across diode 48 is on the order of only 200 millivolts.

In typical utilizations of this device, the tunnel diode 28 will be reset to the low voltage operating condition by the application of a reset signal by source 34 via diode 32 at predetermined times. These times are determined such that the clock signal terminates prior to the application of the reset signal such that current (forward or reverse) will not flow through diode 48. Thus, it is clear that diode 48 completely isolates the tunnel diode from the storage diode network. Moreover, the voltage divider network between sources 38 and 46 is such that the anode of storage diode 22 is effectively clamped at a potential such that the storage diode will not conduct current therethrough except in the presence of a low level input signal at terminal 10 and coupling diode 48 will not conduct current except in response to a clock signal which passes through storage diode 22. Thus, spurious signals cannot be generated by the circuit due to an inadvertent storage of charge in the storage diode when the tunnel diode is in the high voltage operating condition.

Figure 3:
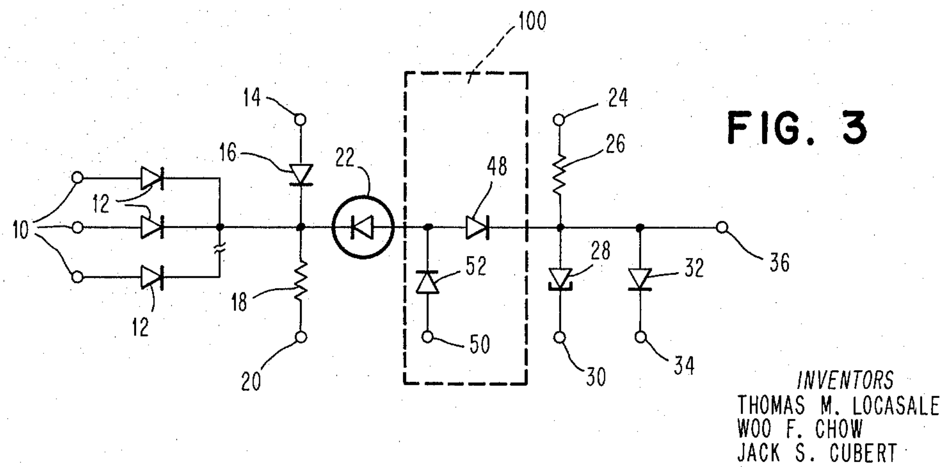
FIGURE 3 is a schematic diagram of a second embodiment of the improved circuit using a diode clamp isolation network.

Referring now to FIGURE 3, there is shown another embodiment of the instant invention. In this embodiment the isolation network which is connected between the storage diode and the tunnel diode comprises a diode clamping arrangement. Otherwise, the components which are similar to those previously shown bear similar reference numerals. Thus, the input signals are supplied by input sources 10 which are connected to the anodes of input coupling diodes 12. The cathodes of the input diodes are connected to the cathode of diode 16, the anode of which is connected to source 14. In addition, the cathode of diode 16 is connected to one terminal of resistance 18 another terminal of which is connected to source 20. The cathode of storage diode 22 is connected to the cathodes of diodes 12 and 16. The anode of storage diode 22 is connected to the cathode of clamping diode 52. The anode of clamping diode 52 is connected to source 50. Typically, clamping diode 52 may be an International Diode ID5–050 type diode. Other types of diodes, including silicon diodes and the like may be used, if desirable. Source 50 may be any convenient type of substantially constant potential source including ground. However, the potential supplied must be sufficient to provide a potential at the anode of diode 22 such that the selective operation is obtained. In the preferred embodiment, source 50 supplies about +850 millivolts. The anode of storage diode 22 is additionally connected to the anode of coupling diode 48. The cathode of diode 48 is connected to the anode of tunnel diode 28. Tunnel diode 28 has the cathode thereof connected to the potential source 30. Also connected to the anode of tunnel diode 28 is the substantially constant current source comprising resistor 26 and source 24. The anode of reset diode 32 is connected to the anode of tunnel diode 28. The cathode of the reset diode 32 is connected to source 34 which supplies periodic pulses. The output terminal 36 is connected to the anode of tunnel diode 28.

Thus, the circuit configuration of FIGURE 3 is basically similar to the circuit configuration of the preceding figures. However, the isolation network within dashed outline 100 has been substituted. The operation of this circuit is similar to the circuit operation previously described. That is, with a high voltage (+450 millivolts) input signal applied to terminal 10, forward current flows through diode 12 from source 10 to sink 20. The voltage drop across diode 12 causes the potential at the cathode thereof to be on the order of +100 millivolts. This potential is determined to effectively reverse bias storage diode 22. That is, source 50 provides a potential of about +850 millivolts. The minimum potential drop across diode 52 is about 200 millivolts. Therefore, the potential at the anode of diodes 22 and 48 is about +650 millivolts. This produces a 550-millivolt drop across storage diode 22 which is not sufficient to cause forward conduction therein.

Conversely, when a low level (+50 millivolt) signal is applied at terminal 10, a forward-biasing potential (about −150 millivolts) is applied to the cathode of diode 22 such that a substantial current flows therethrough. When a current of about 1.5 milliamperes flows in the circuit, the potential drop across diode 52 is about 300 to 350 millivolts. Thus, the potential at the anode of diode 22 drops to about +500 to +550 millivolts. However, since the cathode of diode 22 is at about −150 millivolts, the potential drop across the diode is about +650 to +700 millivolts which supports relatively large forward conduction of the diode.

With the application of a clock signal by source 14 via diode 16, a reverse current is passed through storage diode 22 to tunnel diode 28, via diode 48, after a forward current has been passed through diode 22 and stored charge therein, as in the latter case. This current is effective to switch the state of the tunnel diode. However, if charge was not stored in diode 22, the application of a clock pulse will not produce a current signal which switches tunnel diode 28. Rather, this pulse is dissipated in the substantially constant current sink comprising source 20 and resistor 18.

Figure 4:
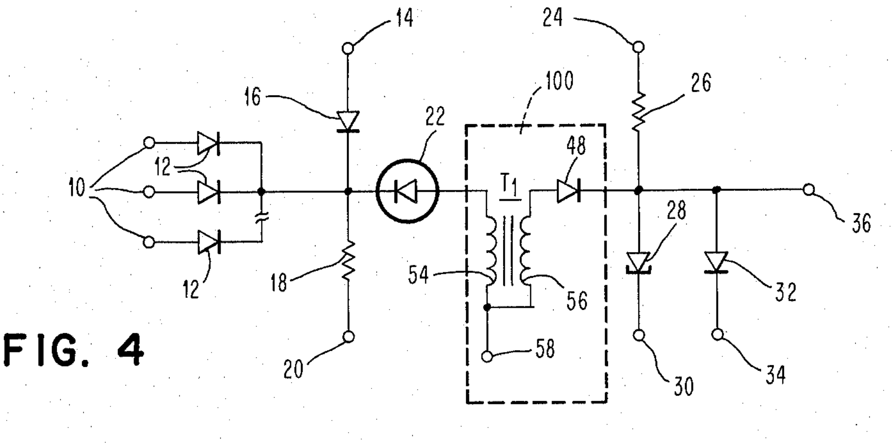
FIGURE 4 is a schematic diagram of a third embodiment of the improved circuit using an inductively-coupled isolation network.

Referring now to FIGURE 4, there is shown another embodiment of this invention. Again, components similar to those shown supra bear similar reference numerals. The distinction between this embodiment and those shown previously is in the isolation circuit within dashed outline 100 and which comprises transformer $T_1$ and coupling diode 48. As shown in this embodiment, the primary winding 54 of transformer $T_1$ has one terminal connected to the anode of storage diode 22 and another terminal thereof connected to source 58. The secondary winding 56 of transformer $T_1$ has one terminal thereof connected to the anode of coupling diode 48 and another terminal thereof connected to source 58. Source 58 may be any conventional source capable of supplying a substantially constant potential. The potential supplied by source 58 may be on the order of about +750 millivolts, for example. However, it may be seen that modifications may be made in the embodiment shown. That is, instead of connecting together terminals of the primary and secondary windings in a common junction, each of these terminals may be connected to separate sources of potential. These separate potential sources may be desirable in order to provide for different potential levels at the anodes of the diodes 22 and 48.

The transformer $T_1$ is preferably a non-inversion transformer having a 1:1 turns ratio. A typical transformer would be an air core transformer having one turn per winding. However, the number of turns is not to be so limited. The suggested number of turns is desirable because of the nature of the signal to be transmitted thereby. That is, the suggested transformer will adequately operate with signals having extremely fast rise times and fall times (on the order of 150 picoseconds) and which have a short total duration, as for example 250 picoseconds.

That this circuit provides isolation is clearly shown inasmuch as the windings 54 and 56 have very low impedance to the substantially constant or D.C. potential supplied by source 58. Thus, the potential at the anodes of the diodes 22 and 48 is substantially similar to the potential supplied by source 58. This potential is determined to inhibit spurious current through storage diode 22 in response to a high voltage level at the anode of tunnel diode 28. However, with the extremely high frequency signals supplied via storage diode 22 in response to a clock signal which is supplied after charge has been stored in diode 22, the impedance of the windings of the transformer is quite substantial. Thus, each of the windings attenuates the passage of the signal from the clock source 14 toward source 58. However, the mutual inductance of the coil windings is of a significant nature such that this signal is passed to the anode of coupling diode 48 and, subsequently, to the anode of tunnel diode 28.

At the extremely high frequencies at which this type of circuit is normally operative, the transformer can be an air core transformer. This observation leads to the embodiment shown in FIGURE 5. Again, the circuit shown in FIGURE 5 incorporates components similar to components shown in the figures previously described which similar components bear similar reference numerals. However, in the isolation circuit contained within the dashed outline 100 a coaxial cable has been substituted for the transformer $T_1$ shown in FIGURE 4. The conductor 64 is connected to the anode of storage diode 22. The conductor 66 is connected to the anode of coupling diode 48. Conductors 64 and 66 are connected together via impedance 62. The impedance 62 is predetermined to be substantially equal to the characteristic impedance of the coaxial cable in order to inhibit signal reflections in the coaxial cable. The conductor 64 is connected to a potential source 60. Potential source 60 may be any type of conventional source capable of supplying a substantially constant potential and may even be ground. However, cables having characteristic impedances of 50 potential on the order of +750 millivolts in order to properly bias the diodes 22 and 48. The operation of the circuit shown in FIGURE 5 is substantially identical to the operation of the circuit shown in FIGURE 4 inasmuch as the coaxial cable operates substantially identical to the transformer $T_1$ when it is considered that the transformer is an air core transformer.

Figure 5:
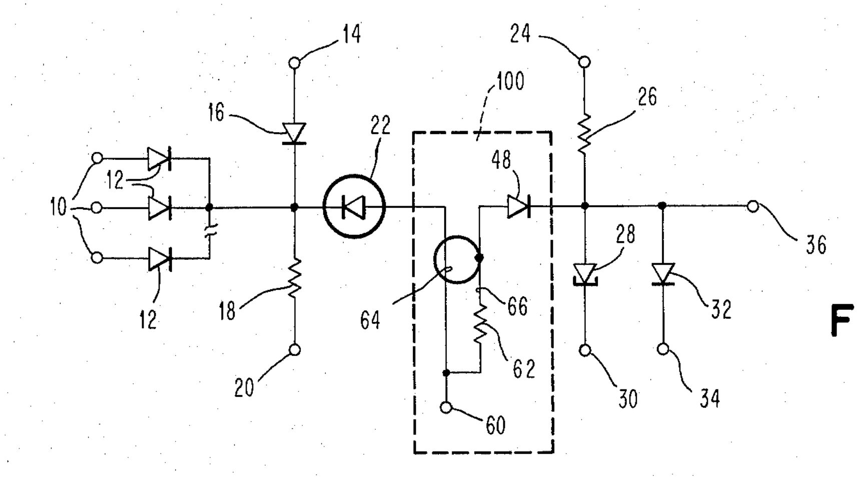
FIGURE 5 is a schematic diagram of a fourth embodiment of the improved circuit using a coaxial cable isolation network.

In the embodiment shown in FIGURE 5, ideally the coaxial cable has a characteristic impedance of 0 ohms. However, cables having characteristic impedances of 50 to 75 ohms have been found acceptable. It is contemplated that with modified signals and the like, modifications can be made in the characteristic impedance requirements of the coaxial cable.

Thus, there have been described several embodiments of an improved circuit using tunnel diodes. This circuit performs the logical NOR function and provides improved and more reliable circuit operation. As has been suggested supra, modifications may be made both in the circuit and in the signals supplied thereto in order to provide further improvements. However, any modifications and alterations which are made to this circuit, but which fall within the inventive principles, are meant to be included within the scope of the appended claims.

The embodiments of the invention in which an exclusive property or privilege is claimed are defined as follows:

1. A logic circuit comprising, a tunnel diode having two stable operating states, bias means for normally biasing said tunnel diode to one of said stable operating states, pulse supplying means for providing signals to switch said tunnel diode from said one state to the other state, storage diode means connected to said pulse supplying means and adapted to selectively pass reverse current in response to the application of a pulse by said pulse supplying means, coupling means connected between said storage diode means and said tunnel diode, said coupling means characterized by the ability to provide a bias potential at the anode of said storage diode means and to selectively pass current therefrom to said tunnel diode in accordance with the selective passage of reverse current through said storage diode.

2. The logic circuit as recited in claim 1 wherein said coupling means comprises, a rectifier diode connected between said storage diode means and said tunnel diode, and a potential divider connected to said storage diode means and said rectifier diode to supply a control potential thereto for defining the operation of said coupling means.

3. The circuit recited in claim 2 wherein said storage diode means has anode means and cathode means, and said rectifier diode has anode means and cathode means, said anode means each being connected together and to said potential divider.

4. The circuit recited in claim 2 wherein said rectifier diode exhibits a higher forward potential drop than said storage diode means.

5. The logic circuit recited in claim 1 wherein said coupling means comprises a first rectifier diode connected between said storage diode means and said tunnel diode, and a second rectifier diode connected between a potential source and the connection between said storage diode means and said first rectifier diode such that predetermined biasing potential values may be applied to said storage diode means and said first rectifier diode via said second rectifier diode to permit the selective operation of said coupling means.

6. The logic circuit recited in claim 1 wherein said coupling means comprises a rectifier diode, transformer means having first and second windings, said transformer means having one terminal of said first winding connected to said storage diode means and one terminal of said second windings connected to said rectifier diode, and potential source means connected to further terminals of each of said first and second windings.

7. The logic circuit as recited in claim 1 wherein said coupling means comprises a rectifier diode, and a transmission line connected between said storage diode means and said rectifier diode.

8. A logic circuit comprising, input supplying means adapted to provide signals having two separate levels, potential divider means for supplying at least one predetermined potential value, variable impedance means connected between said input supplying means and said potential divider means whereby the impedance of said variable impedance means may be controlled by said signals supplied by said input supplying means, switching means having two stable states of operation, non-linear impedance means connected between said bistable switching means and said variable impedance means, and means for changing the state of operation of said switching means in accordance with the impedance of said variable impedance means.

9. In combination, input means, said input means adapted to supply signals having two different levels, output means, pulse supplying means adapted to supply periodic signals, first non-linear impedance means characterized by charge storage capabilities and having at least first and second electrodes, said first non-linear impedance means having said first electrode connected to said input means and said pulse supplying means to receive signals therefrom alternatively, potential supplying means connected to said second electrode of said first non-linear impedance means, said potential supplying means operative to prevent charge storage in said first non-linear impedance except in response to the application of an input signal of one level, second non-linear impedance means connected to said potential supplying means and adapted to be non-conductive in the absence of a signal supplied by said pulse supplying means subsequent to charge storage in said first non-linear impedance means, tunnel diode means having two stable states connected to said second non-linear impedance means, bias means for biasing said tunnel diode in one of its two stable states, said tunnel diode adapted to change stable states in response to conduction by said second non-linear impedance means, and reset means for assuring that said tunnel diode is in its said one stable state.

10. In combination, input means, said input means adapted to supply signals having two different levels, output means, pulse supplying means adapted to supply periodic signals, first non-linear impedance means characterized by charge storage capabilities, said first non-linear impedance means connected to said input means and said pulse supplying means to receive signals therefrom, potential supplying means connected to said first non-linear impedance means, said potential supplying means operative to prevent charge storage in said first non-linear impedance except in response to the application of an input signal of one level, second non-linear impedance means connected to said potential supplying means and adapted to be non-conductive in the absence of a signal supplied by said pulse supplying means subsequent to charge storage in said first non-linear impedance means, and tunnel diode means having two stable states connected to said second non-linear impedance means.

11. In combination, input means, pulse supplying means, first non-linear impedance means having one electrode connected to said input means and to said pulse supplying means, potential supplying means connected to a second electrode of said first non-linear impedance means, second non-linear impedance means having one electrode connected to said potential supplying means, tunnel diode means connected to a second electrode of said second non-linear impedance means, bias means connected to said tunnel diode means, and output means connected to said tunnel diode means.

12. In combination, input means, means selectively exhibiting bilateral conduction connected to said input means, bistable means, means exhibiting unilateral conduction connected between said means exhibiting bilateral conduction and said bistable means, and substantially constant potential supplying means connected to each of said bilateral and unilateral conduction means such that said bilateral conduction means is isolated from said bistable means; said combination further including periodic pulse supplying means connected to said bilateral conduction means and said input means, said pulse supplying means supplying pulses via said selectively bilateral conduction means and said unilateral conduction means to said bistable means, said pulses having sufficient magnitude and sense to selectively overcome the isolation produced by said potential supplying means and said unilateral conduction means.

13. A logic circuit comprising, a tunnel diode having two stable operating states, bias means for normally biasing said tunnel diode to one of said stable operating states, pulse supplying means for providing signals to selectively switch said tunnel diode from said one state to the other state, storage diode means connected to said pulse supplying means and adapted to selectively pass reverse current in response to the application of a pulse by said pulse supplying means when charge has previously been stored therein, coupling means connected between said storage diode means and said tunnel diode, said coupling means providing a bias potential at said storage diode means, said coupling means being capable of selectively passing current from said storage diode means to said tunnel diode in accordance with the selective passage of reverse current through said storage diode means.

14. In combination, input means, said input means adapted to supply signals having two different levels, output means, pulse supplying means adapted to supply periodic signals, a charge storage diode having at least an anode and a cathode, said charge storage diode having said cathode connected to said input means and to said pulse supplying means to receive signals therefrom alternatively, substantially constant potential supplying means connected to said anode of said charge storage diode, said potential supplying means operative to prevent charge storage in said charge storage diode except in response to the application of an input signal of one level, a rectifier diode having at least an anode and a cathode, said rectifier diode anode connected to said potential supplying means and adapted to be non-conductive in the absence of a signal supplied by said pulse supplying means subsequent to charge storage in said charge storage diode means which produces a reverse current flow in said charge storage diode, tunnel diode means having two stable states connected to said rectifier diode, bias means for biasing said tunnel diode means in one of its two stable states, said tunnel diode means adapted to change stable states in response to conduction by said rectifier diode, and reset means for assuring that said tunnel diode means is in its said one stable state.

References Cited by the Examiner

UNITED STATES PATENTS

| | | | |
|---|---|---|---|
| 3,040,186 | 6/1962 | Van Duzer | 307—88.5 |
| 3,106,644 | 8/1963 | Retzinger | 307—88.5 |

ARTHUR GAUSS, *Primary Examiner*.